United States Patent
Laster

(10) Patent No.: US 10,451,732 B2
(45) Date of Patent: Oct. 22, 2019

(54) EVENT TRIGGERING USING SONAR DATA

(71) Applicant: Navico Holding AS, Egersund (NO)

(72) Inventor: Matthew Laster, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 422 days.

(21) Appl. No.: 14/566,513

(22) Filed: Dec. 10, 2014

(65) Prior Publication Data

US 2016/0170022 A1    Jun. 16, 2016

(51) Int. Cl.
  *G01S 15/89*    (2006.01)
  *G01S 7/62*    (2006.01)
  *G01S 15/66*    (2006.01)

(52) U.S. Cl.
  CPC ............ *G01S 15/89* (2013.01); *G01S 7/6218* (2013.01); *G01S 15/66* (2013.01)

(58) Field of Classification Search
  CPC . G01S 15/89; G01S 15/66; G01S 7/62; G01S 7/6218; G01S 7/6281; G01S 15/025; G01S 7/003
  USPC .......................................................... 367/7
  See application file for complete search history.

(56) References Cited

U.S. PATENT DOCUMENTS

| | | | | |
|---|---|---|---|---|
| 3,159,806 A | | 12/1964 | Piasecki | |
| 3,304,532 A | * | 2/1967 | Nelkin | G01S 15/8902 367/115 |
| 3,417,369 A | * | 12/1968 | Richard | G01D 15/14 342/190 |
| 3,451,038 A | * | 6/1969 | Maass | G01S 7/529 346/33 EC |
| 3,761,873 A | * | 9/1973 | Hopkin | G01S 7/527 367/115 |
| 3,975,704 A | * | 8/1976 | Klein | G01S 7/534 333/14 |
| 4,096,484 A | * | 6/1978 | Ferre | G01D 9/00 346/33 EC |
| 4,164,379 A | * | 8/1979 | Denman | G05D 1/0206 367/106 |
| 4,281,427 A | | 8/1981 | Petters | |
| 4,686,659 A | * | 8/1987 | Yamamoto | G01S 7/6263 367/101 |
| 4,893,286 A | * | 1/1990 | Cobb | E21B 47/082 181/105 |

(Continued)

OTHER PUBLICATIONS

"Deeper"; https://deepersonar.com/en; (retrieved May 22, 2017).

(Continued)

*Primary Examiner* — Isam A Alsomiri
*Assistant Examiner* — Amie M Ndure
(74) *Attorney, Agent, or Firm* — Nelson Mullins Riley & Scarborough LLP

(57) ABSTRACT

Various implementations described herein are directed to a non-transitory computer readable medium having stored thereon computer-executable instructions which, when executed by a computer, may cause the computer to receive sonar data from a transducer after deployment of the transducer in a body of water. The computer may process the sonar data to detect a bottom of the body of water based on the sonar data received from the transducer. The computer may automatically trigger at least one event upon detecting the bottom of the body of water.

20 Claims, 11 Drawing Sheets

(56) References Cited

U.S. PATENT DOCUMENTS

| | | | |
|---|---|---|---|
| 4,953,147 A * | 8/1990 | Cobb | E21B 47/082 181/105 |
| 5,483,767 A | 1/1996 | Langer | |
| 6,909,669 B1 * | 6/2005 | Yankielun | H04B 13/02 367/13 |
| 7,813,224 B2 * | 10/2010 | Krumhansl | G01V 1/147 181/121 |
| 9,182,234 B2 | 11/2015 | Ninomiya et al. | |
| 2004/0004904 A1 | 1/2004 | Betts | |
| 2004/0068371 A1 | 4/2004 | Estep | |
| 2006/0159524 A1 | 7/2006 | Thompson et al. | |
| 2006/0238383 A1 | 10/2006 | Kimchi et al. | |
| 2007/0147173 A1 | 6/2007 | Park | |
| 2008/0236275 A1 * | 10/2008 | Breed | B60C 11/24 73/290 V |
| 2008/0282817 A1 * | 11/2008 | Breed | B60C 11/24 73/865.9 |
| 2009/0058593 A1 * | 3/2009 | Breed | B60C 11/24 340/5.2 |
| 2009/0231953 A1 * | 9/2009 | Welker | G01V 1/3835 367/19 |
| 2010/0085198 A1 | 4/2010 | Boss et al. | |
| 2010/0157736 A1 * | 6/2010 | Riordan | G01S 15/87 367/88 |
| 2010/0199225 A1 * | 8/2010 | Coleman | G06F 3/038 715/858 |
| 2011/0132093 A1 * | 6/2011 | Citta | G01S 7/52006 73/632 |
| 2014/0071167 A1 * | 3/2014 | Lauenstein | G06T 17/05 345/634 |
| 2015/0138923 A1 * | 5/2015 | Abernathy | E21B 43/26 367/137 |
| 2015/0138924 A1 * | 5/2015 | Schaefers | G10K 11/18 367/138 |
| 2015/0293213 A1 * | 10/2015 | Felber | G01S 7/521 367/3 |
| 2016/0170013 A1 | 6/2016 | Laster | |

OTHER PUBLICATIONS

"Deeper"; Deeper, UAB; deeper.eu•, 2012-2016; (retrieved May 22, 2017).

"Humminbird RF"; https://www.humminbird.com/productDetail-Lifestyle.aspx?ed=763; 2017; (retrieved Jun. 8, 2017).

"Vexilar SonarPhone"; vexilar.com; 2017; (retrieved May 22, 2017).

\* cited by examiner

EVENT TRIGGERING USING SONAR DATA

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Communicating data, including, for example, sonar data, can be useful. Communicating with a device that can collect this data can provide advantages to a boat pilot. Such advantages can include using this data to perform various actions.

SUMMARY

Described herein are implementations of various technologies for a method of event triggering using sonar data. In one implementation, a non-transitory computer-readable medium having stored thereon a plurality of computer-executable instructions which, when executed by a computer, cause the computer to perform various actions. The actions may include receiving sonar data from a transducer after deployment of the transducer in a body of water. The actions may include processing the sonar data to detect a bottom of the body of water based on the sonar data received from the transducer. The actions may include automatically triggering at least one event upon detecting the bottom of the body of water.

Described herein are implementations of various technologies for a transducer. In one implementation, the transducer may include a processor and memory including instructions that cause the processor to perform various actions. The actions may include generating sonar data after deployment of the transducer in a body of water. The actions may include processing the sonar data to detect a bottom of the body of water based on the sonar data. The actions may include automatically triggering at least one event upon detecting the bottom of the body of water. The at least one event may include automatically transmitting the sonar data to a computing device for recording by the computing device.

Described herein are implementations of various technologies for a castable device. In one implementation, the castable device may include at least one sonar transducer element, a processor, and memory including instructions that cause the processor to perform various actions. The actions may include receiving sonar data from the at least one sonar transducer element after deployment of the castable device in a body of water. The actions may include processing the sonar data to detect a bottom of the body of water based on the sonar data received from the at least one sonar transducer element. The actions may include automatically triggering at least one event upon detecting the bottom of the body of water. The at least one event may include automatically transmitting the sonar data to a computing device for recording by the computing device.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
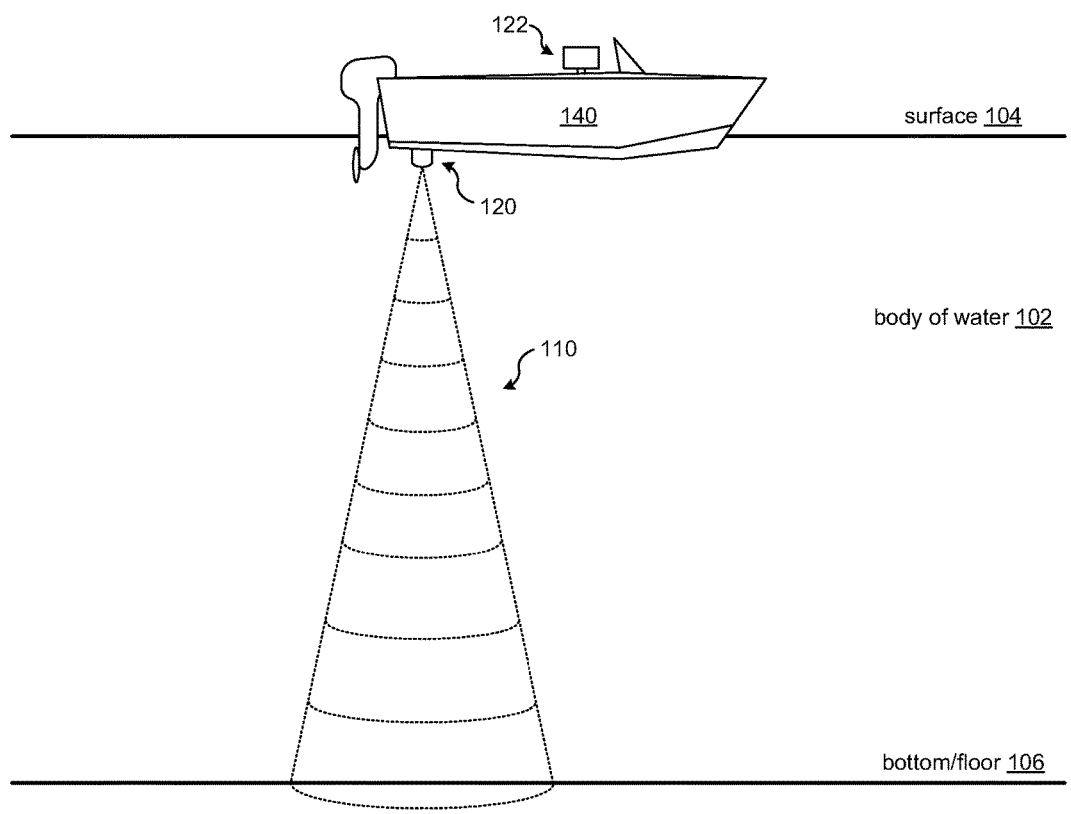
FIGS. 1A-1B illustrate views of a sonar beam in accordance with various implementations described herein.

Various implementations described herein are directed to event triggering based on sonar data.

In one implementation, the event triggered by the sonar data may involve auto-recording sonar data generated by and received from a vessel-mounted (or coupled) sonar transducer, which may be referred to as a vessel-mounted transducer, a sonar transducer, or simply a transducer. When the vessel-mounted transducer is deployed in water (e.g., a body of water, such as a lake, river, stream, pond, etc.), the transducer may be configured to power-up and automatically transmit sonar data. For instance, the vessel-mounted transducer may automatically transmit sonar data after launching the vessel in a body of water. In this instance, the vessel-mounted transducer may be configured to transmit the sonar data to a computing device (e.g., a marine electronics device, a multi-function display (MFD), tablet, smart phone, etc.). Once received, the computing device may be configured to detect a bottom of the body of water based on the received sonar data and trigger auto-recording of the sonar data and create a sonar log of the sonar data. When the vessel-mounted transducer is removed from water (e.g., removing or withdrawing the vessel from the water by a user), the transducer may be configured to power-down and stop transmitting sonar data to the computing device. In this instance, the computing device may stop recording sonar data when the sonar data is no longer generated and received from the vessel-mounted transducer. In some implementations, the computing device may be configured to upload the sonar data and/or the sonar log to a network server, such as a cloud. The computing device may also be configured to store/record multiple sonar logs and create a map therefrom. In other implementations, the computing device and/or the cloud may be configured to create a map by stitching multiple sonar logs together to thereby create a conjoined sonar log.

In another implementation, the event triggering using sonar data may involve auto-recording sonar data received from a castable sonar transducer, which may also be referred to as a castable transducer. For instance, when the castable transducer is deployed/casted in a body of water (e.g., lake, river, stream, pond, etc.) by a user, the transducer may power-up and begin transmitting sonar data. For instance, the castable transducer may automatically transmit sonar data after being casted in the body of water. The sonar data generated and transmitted by the castable transducer may then be received by a computing device (e.g., MFD, tablet, smart phone, etc.), and the computing device may be configured to auto-detect a bottom of the body of water to thereby trigger auto-recording of the sonar data and/or create a sonar log of the sonar data. Further, when the castable transducer senses removal from the body of water (e.g., reeling in and removal/withdrawal of the castable transducer from the body of water by the user), the castable transducer may power-down and stop/cease transmitting sonar data. In some implementations, the computing device may be further configured to upload the sonar data and/or the sonar log to a network server, such as a cloud. The computing device may be configured to store/record multiple sonar logs and create a map therefrom. In some other implementations, the computing device and/or the cloud may be configured to create one or more other maps by stitching together multiple sonar logs to thereby create a conjoined sonar log.

Various implementations of event triggering using sonar data described herein will now be described in more detail with reference to FIGS. 1A-6.

Figure 1B:
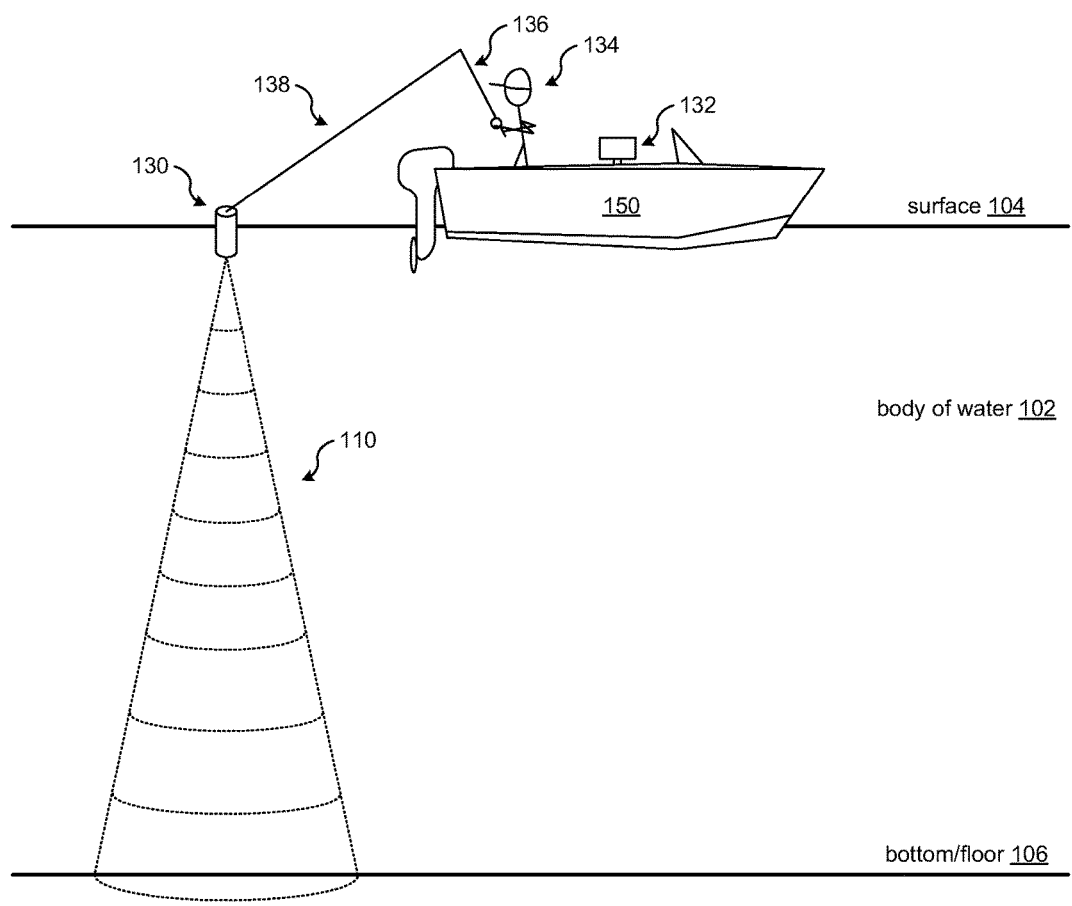

FIGS. 1A-1B illustrate views of a sonar beam 110 in accordance with various implementations described herein. In FIGS. 1A-1B, the sonar beam 110 may be generated by transducers 120, 130 in various deployment configurations. In some implementations, each of the transducers 120, 130 may include a sonar transducer, such as a downscan transducer for capturing sonar data in a body of water 102. As will be shown and described herein, various implementations refer to detecting a bottom or floor (e.g., via bottom lock) of the body of water 102 using sonar data and then auto-recording sonar data received from a sonar transducer mounted to a vessel, e.g., a boat, and alternatively, using a castable sonar transducer.

In various implementations, the sonar beam 110 of either transducer 120, 130 may include one or more of a conical beam projection and a linear beam projection. For example, the sonar beam 110 of either or both transducers 120, 130 may include a conical downscan beam projection having a coverage area of a beam produced by a circular downscan transducer. In another example, the sonar beam 110 of either or both transducers 120, 130 may include a linear downscan beam projection having a coverage area of a beam produced by a linear downscan transducer. Further, the transducers 120, 130 may include one or more or an array of sonar transducer elements configured to capture sonar data associated with the body of water 102.

FIG. 1A illustrates a view of the sonar beam 110 in accordance with an implementation. The transducer 120 may include a vessel-mounted or vessel-coupled sonar transducer having electrode terminals (not shown) configured to activate (e.g., power-up) the transducer 120 when the vessel is deployed in water (e.g., the body of water 102). The vessel-mounted or vessel-coupled sonar transducer may be referred to as the sonar transducer or simply as the transducer. In some implementations, the transducer 120 may be configured to transmit sonar data and/or command signals to a computing device 122 (e.g., a marine electronics device, a multi-function display (MFD), a smart phone, etc.) provided on a vessel 140 for recording the sonar data. For instance, the computing device 122 may be configured to receive sonar data from the transducer 120 and process the sonar data to thereby detect a bottom or floor 106 of the body of water 102 based on the sonar data received from the transducer 120. In response to detecting the bottom 106 of the body of water 102, the computing device 122 may be configured to auto-trigger at least one event, such as auto-recording the sonar data received from the transducer 120.

In some implementations, the computing device 122 may include a processing component (e.g., a processor) and memory including instructions configured to cause the processing component to perform various actions, functions, and/or operations. For instance, the instructions may be configured to cause the processing component to receive sonar data from the transducer 120 and process the sonar data by performing one or more bottom detection algorithms (e.g., bottom lock) to detect (and/or gain a lock on) the bottom 106 of the body of water 102. Generally, in some instances, bottom lock may refer to various processing techniques where sonar is used to detect a seafloor (or seabed) below a water surface and calculate variations in water depth from the water surface to the seafloor. In some sonar devices, this bottom lock technique may be referred to as bottom tracking.

As shown in the example of FIG. 1A, the transducer 120 may be coupled to the vessel 140 (e.g., a boat). The transducer 120 may include a dedicated sensor (e.g., a water sensor) configured for automatically sensing deployment of the transducer 120 in water, such as the body of water 102. For instance, the transducer 120 may be configured to activate when the vessel is deployed in the body of water 102. In this instance, sensing deployment may occur after launching the vessel 140 in/on the body of water 102. The transducer 120 may be coupled or mounted to the vessel 140 in any position and/or side thereof. The sonar data generated/transmitted by the transducer 120 may be used for imaging environmental features (e.g., fish, plants, rocks, etc.) in the body of water 102. In some implementations, this imaging may include mapping an underwater environment below a surface 104 of the body of water 102 between the surface 104 of the body of water 102 and the bottom/floor 106 of the body of water 102.

Once deployed, the transducer 120 may be configured to activate and start transmitting sonar data to the computing device 122. Thus, in some implementations, sensing deployment may be based on the computing device 122 processing the sonar data to detect the bottom 106 of the body of water 102 in response to sonar data being received by the computing device 122. In this instance, detection of the bottom 106 is made possible by receiving and processing the sonar data. Alternatively, upon activation, the transducer 120 may be configured to transmit one or more command signals to the computing device 122 to detect the bottom 106 of the body of water 102 and then start recording the sonar data. In this instance, the computing device 122 may be configured to sense deployment of the transducer 120 in the body of water 120, e.g., by receiving sonar data and/or command signals from the transducer 120, auto-detecting the bottom 106 of the body of water 102, and then triggering at least one event, which may include auto-recording the sonar data generated and transmitted by the transducer 120.

In one implementation, the dedicated sensor may be configured for sensing removal of the transducer 120 from the body of water 102. For instance, the electrode terminals may be configured to deactivate (e.g., power-down) the transducer 120 upon removal/withdrawal of the transducer 120 from the body of water 102, e.g., along with the vessel 140. In this instance, sensing removal of the transducer 120 may occur after removing/withdrawing the vessel 140 from or out of the body of water 102 along with the transducer 120. That is, as a vessel coupled/mounted device, the transducer 120 may be removed from the body of water 102 when the vessel 140 is removed from the body of water 102.

Once removed, the transducer 120 may be configured to deactivate and stop transmitting sonar data to the computing device 122. Thus, in some implementations, sensing removal may be based on the computing device 122 failing to detect the bottom 106 of the body of water 102 in response to the sonar data no longer being received by the computing device 122. In this instance, detection of the bottom 106 would not be possible without receiving sonar data. Alternatively, upon deactivation, the transducer 120 may be configured to transmit one or more other command signals to the computing device 122 to stop recording the sonar data. As such, the computing device 122 may be configured to sense removal of the transducer 120 from the body of water 120 and then trigger at least one other event, which may indicate to the computing device 122 to stop recording the sonar data generated by the transducer 120.

In some implementations, the transducer 120 may include a processing component (e.g., a processor) and memory including instructions configured to cause the processing component to perform various actions, functions, and/or operations. For instance, the memory instructions may be configured to cause the processing component to generate and transmit sonar data to the computing device 122. This may occur in response to the processing component processing the sonar data to thereby detect the bottom 106 of the body of water 102. As such, the memory instructions may be configured to cause the processing component to auto-transmit the sonar data to the computing device 122 for storing/recording by the computing device 122 after the processing component of the transducer 120 detects the bottom 106 of the body of water 102 based on the sonar data.

FIG. 1B illustrates a view of the sonar beam 110 in accordance with another implementation. The transducer 130 may include a castable sonar transducer having electrode terminals (not shown) configured to activate (e.g., power-up) the castable sonar transducer when deployed in water (e.g., the body of water 102). The castable sonar transducer may be part of a castable device having a sonar transducer component. The castable sonar transducer 130 may be referred to as the castable transducer, the sonar transducer or simply the transducer. In some implementations, the castable transducer 130 may be configured to transmit sonar data and/or command signals to a computing device 132 (e.g., a marine electronics device, MFD, smart phone, etc.) for detecting the bottom 106 of the body of water 102 and for auto-recording the sonar data upon bottom detection. For instance, the computing device 132 may be configured to receive sonar data from the castable transducer 130 and then process the sonar data to detect a bottom or floor 106 of the body of water 102 based on the sonar data received from the castable transducer 130. In response to detecting the bottom 106 of the body of water 102, the computing device 132 may be configured to automatically trigger at least one event, such as automatically recording the sonar data received from the castable transducer 130.

As mentioned above, the castable transducer 130 may be incorporated inside or attached to a castable device. For instance, as a castable device, the castable transducer 130 may be coupled to a casting device, such as a rod 136 (e.g., a fishing rod or pole), via a line 138 (e.g., a fishing line). In this instance, the rod 136 may be configured for casting the transducer 130 into the body of water 102 by a user 134. As shown in FIG. 1B, the user 134 may cast the transducer 130 into the body of water 102, while the user 134 (e.g., boat pilot, fisherman, etc.) is positioned within the vessel 150, such as a boat, that is positioned in the body of water 102. As part of a castable device, the castable transducer 130 may be configured to at least partially float on a surface of a body of water (e.g., the surface 104 of the body of water 102), or to at least partially submerge below the surface 104 of the body of water 102.

In some implementations, the castable transducer 130 may include a sensor, such as a dedicated sensor (e.g., a water sensor) configured for automatically sensing deployment of the castable transducer 130 in/on water. For instance, the castable transducer 130 may include electrode terminals (not shown) configured to activate (e.g., power-up) the castable transducer 130 when the transducer 130 is casted in/on the body of water 102. In this instance, sensing deployment may occur after casting the transducer 130 in/on the body of water 102 by the user 134. Once casted/deployed, the castable transducer 130 may be configured to activate and start transmitting sonar data to the computing device 132. In some implementations, sensing deployment may be based on the computing device 132 processing the sonar data to detect the bottom 106 of the body of water 102 in response to sonar data being received by the computing device 132. In this instance, detection of the bottom 106 of the body of water 102 is made possible by receiving/processing the sonar data. Alternatively, upon activation, the castable transducer 130 may be configured to transmit one or more command signals to the computing device 132 to start detecting the bottom 106 and then auto-recording the sonar data. As such, the computing device 122 may be configured to sense deployment of the castable transducer 130 in the body of water 130 by receiving sonar data from the castable transducer 130, auto-detect the bottom 102 of the body of water 120, and then auto-trigger at least one event, which may include auto-recording of sonar data generated and transmitted by the castable transducer 130.

In some implementations, the dedicated sensor of the castable transducer 130 may be configured for automatically sensing removal of the castable transducer 130 from water, such as the body of water 102. For instance, the electrode terminals may be configured to deactivate (e.g., power-down) the transducer 120 upon removal or withdrawal of the transducer 120 from the body of water 102. In this instance, sensing removal may occur after reeling in (i.e., removing or withdrawing) the transducer 130 out of the body of water 102 by the user 134. As a castable device, the castable transducer 130 may be coupled to the rod 136 and be reeled out of the body of water 102 by the user 134 via the line 138. The rod 136 may comprise a user-actuable rod that may be configured for reeling the castable transducer 130 by the user 134. As such, the user 134 may reel the castable transducer 130 out of the body of water 102, while the user 134 is positioned within the vessel 150.

Figure 2:
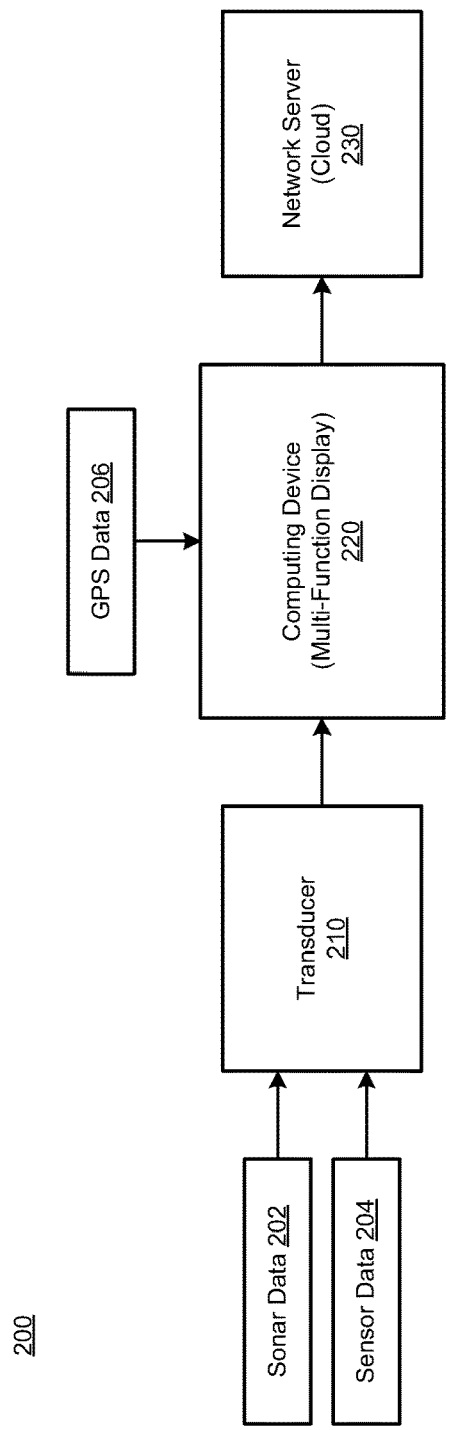
FIG. 2 illustrates how various data recorded by a sonar transducer may flow in accordance with various implementations described herein.

FIG. 2 illustrates a flow 200 of data in accordance with various implementations described herein. In FIG. 2, one or more of sonar data 202 and sensor data 204 may be received by a transducer 210 and transmitted to a computing device 220 (e.g., a marine electronics device, a MFD, a smart phone, etc.). In some examples, the computing device 220 may be configured to upload the sonar data 202 and/or the sensor data 204 to a network server 230 (e.g., cloud server) having memory and/or at least one database via a network (e.g., cloud based network). Further, as will be described in reference to FIGS. 4A-4C, the computing device 220 may include a geo-positioning transceiver for receiving global positioning system data 206 (i.e., GPS data). As such, in some implementations, the computing device 220 may be configured to receive and associate geo-coordinate data, such as the GPS data 206, to one or more of the sonar data 202 and the sensor data 204 at any time, including prior to upload. The network may include various types of communication networks and/or cloud based networks, including wired networks and/or wireless networks.

Figure 3A:
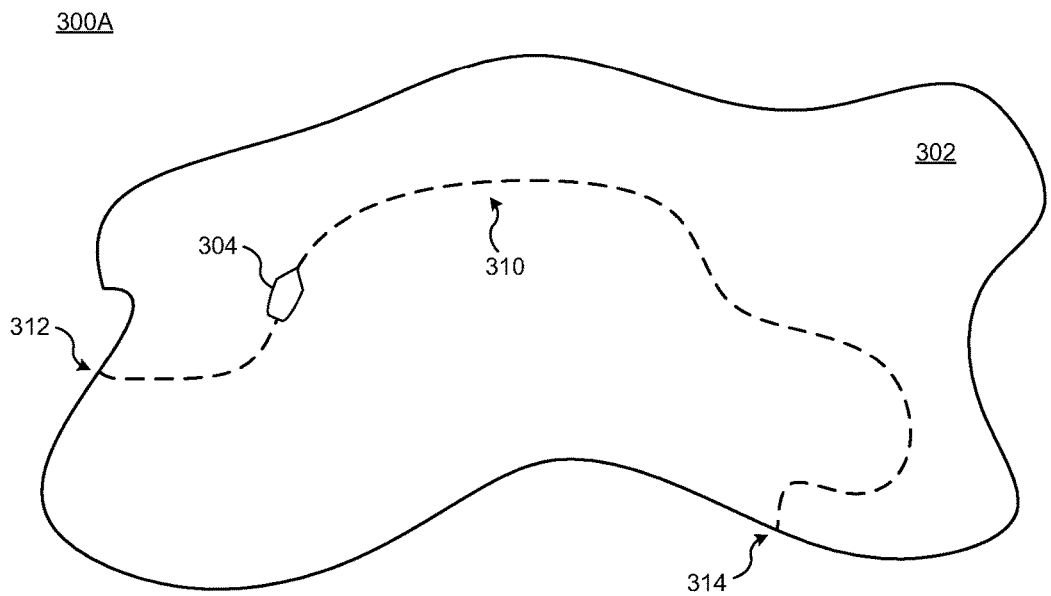
FIGS. 3A-3C illustrate views of tracking or mapping navigated courses of a vessel on a body of water in accordance with implementations of various techniques described herein.
Figure 3B:
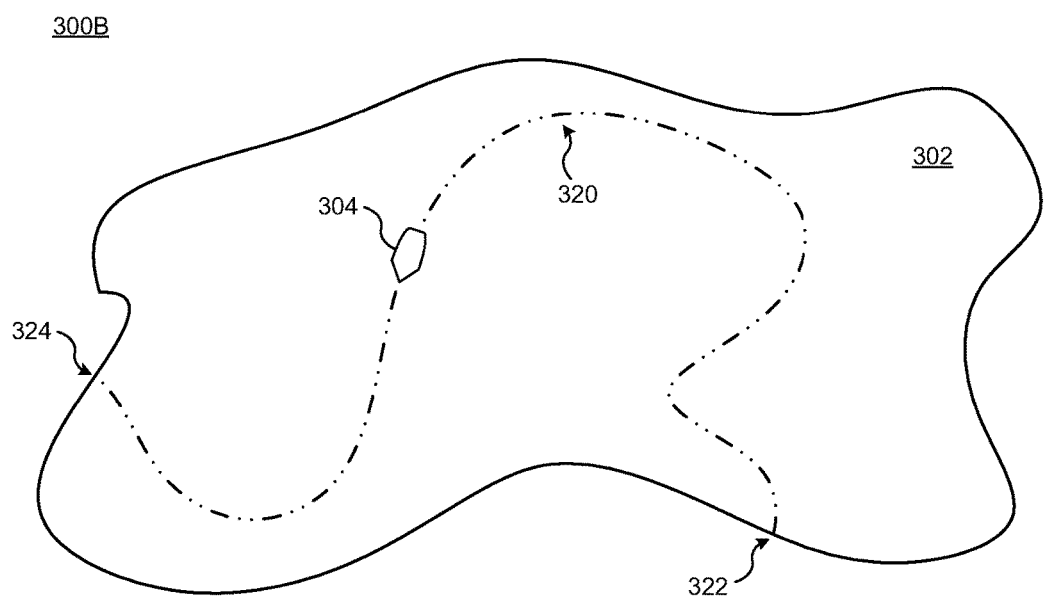
Figure 3C:
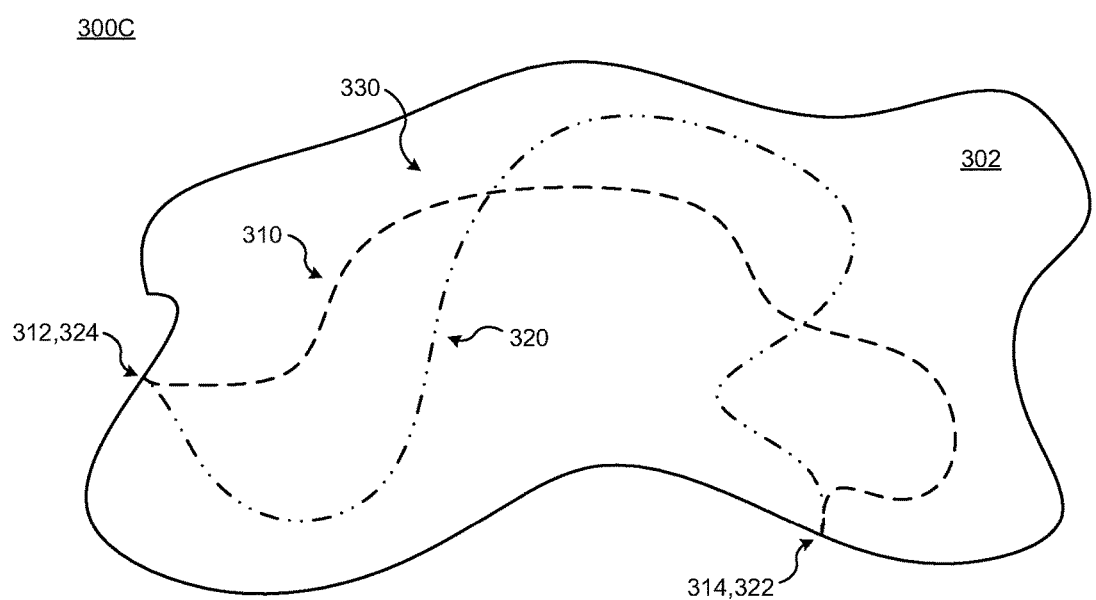

FIGS. 3A-3C illustrate views of tracking or mapping various navigated courses of a vessel on a body of water, the vessel having a vessel-mounted sonar transducer, in accordance with implementations of various techniques described herein.

FIG. 3A illustrates a top view 300A of tracking or mapping a navigated course of a vessel 304 on a body of water 302, the vessel 304 having a sonar transducer, in accordance with implementations of various techniques. In FIG. 3A, the navigable vessel 304, such as a watercraft, boat, etc., may employ a computing device, such as a marine electronics device, a multi-function display (MFD), a smart phone, etc., to collect various types of data and/or information related to a body of water, such as the body of water 302. As described herein, the computing device may be configured to generate sonar data for imaging environmental features in the body of water 302, such as features between a surface and bottom of the body of water 302.

In some implementations, the computing device may be configured to record sonar data from a transducer along with geographical positions related to geographical coordinate data received from a global positioning system (GPS) transceiver. The computing device may be further configured to generate at least one map, such as the first trail map 310 of a first navigated course for the vessel 304 during a first time period, based on at least the GPS data received from the GPS transceiver and/or a time stamp range related to the first time period. The computing device may display images associated with the first trail map 310 to a user piloting the vessel 304, such as a boat captain or fisherman. The first trail map 310 and images associated therewith may be based on a plot of previously recorded geographical positions related to the GPS data received from the GPS transceiver. For instance, the computing device may be configured to generate the first trail map 310 with at least one start point 312 (e.g., a particular geographical position where the user launched the vessel 304 in the body of water 302 during the first time period) and at least one end point 314 (e.g., a particular geographical position where the user removed the vessel 304 from the body of water 302 during the first time period). Further, the computing device may be configured to store the sonar data along with the GPS data and the first trail map 310 including the first time period, the start point 312, and the end point 314 in memory, such as a database, and then upload one or more of the sonar data, the GPS data, and the first trail map 310 to a network server, such as cloud, via a communication network.

FIG. 3B illustrates another top view 300B of tracking or mapping another navigated course of the vessel 304 on the body of water 302, the vessel 304 having the sonar transducer, in accordance with implementations of various techniques. In FIG. 3B, the computing device may be configured to generate a second trail map 320 of a second navigated course for the vessel 304 during a second time period, based on at least the GPS data received from the GPS transceiver and/or a time stamp range related to the second time period. As shown in FIGS. 3A and 3B, the second trail map 320 of the second navigated course may be different than the first trail map 310 of the first navigated course. The computing device may display images associated with the second trail map 320 to a user piloting the vessel 304, such as a boat captain or fisherman. The second trail map 320 and images associated therewith may be based on a plot of previously recorded geographical positions related to the GPS data received from the GPS transceiver. The computing device may be configured to generate the second trail map 320 with at least one start point 322 (e.g., a particular geographical position where the user launched the vessel 304 in the body of water 302 during the second time period) and at least one end point 324 (e.g., a particular geographical position where the user removed the vessel 304 from the body of water 302 during the second time period). Further, the computing device may be configured to store the sonar data along with the GPS data and the first trail map 320 including the second time period, the start point 312, and the end point 314 in memory, such as a database, and then upload one or more of the sonar data, the GPS data, and the first trail map 320 to a network server, such as cloud, via a communication network.

FIG. 3C illustrates a top view 300C of tracking or mapping multiple navigated courses on the body of water 302 in accordance with implementations of various techniques. For instance, as shown in FIG. 3B, the computing device may be configured to track or map multiple navigated courses (e.g., such as the first and second navigated courses) on the body of water 302 based on geographical coordinate data received from the GPS transceiver and generate a trail map (e.g., such as the first and second trail maps 310, 320) for each navigated course with each trail map 310, 320 having at least one start point 312, 322 and at least one end point 314, 324 for each navigated course.

In some implementations, the computing device may be configured to auto-record sonar data received from a transducer based upon detecting a bottom of a body of water, such as the body of water 302. Therefore, in reference to FIG. 3C, the computing device may be configured to start generating the first trail map 310 beginning at the first start point 312 based on detecting the bottom of the body of water 302 using sonar data during the first time period. As described herein, the first trail map 310 is associated with mapping or tracking the first navigated course on the body of water 302 during the first time period based on the sonar data and geographical coordinate data received from the GPS transceiver during the first time period. The computing device may be configured to stop generating the first trail map 310 and terminate at the first end point 314 based on failing to detect the bottom of the body of water 302 at the first end point 314, which may be based on failure to receive sonar data from the transducer at the first end point 314. After termination, the computing device may be configured to upload one or more of the sonar data recorded during the first time period, the geographical coordinate data recorded during the first time period, and the first trail map 310 recorded during the first time period to at least one network database (e.g., a cloud) via a communication network.

At some time later, the computing device may start generating the second trail map 320 beginning at the second start point 322 based on detecting the bottom of the body of water 302 using sonar data during the second time period. As described herein, the second trail map 320 is associated with mapping or tracking the second navigated course on the body of water 302 during the second time period based on the sonar data and geographical coordinate data received from the GPS transceiver during the second time period. The computing device may stop generating the second trail map 320 and terminate at the second end point 324 based on failing to detect the bottom of the body of water 302 at the second end point 324, which may be based on failure to receive sonar data from the transducer at the second end point 324. After termination, the computing device may be configured to upload one or more of the sonar data recorded during the second time period, the geographical coordinate data recorded during the second time period, and the second trail map 320 recorded during the second time period to at least one network database (e.g., a cloud) via a communication network.

In some implementations, the computing device may be configured to store multiple sonar logs and create a map therefrom. Further, the computing device may be configured to create a map by stitching multiple sonar logs together to thereby create a conjoined sonar log. For instance, the computing device may generate a first sonar log that includes one or more of the sonar data recorded during the first time period, the geographical coordinate data recorded during the first time period, and the first trail map 310 generated during the first time period. In another instance, the computing device may generate a second sonar log that includes one or more of the sonar data recorded during the second time period, the geographical coordinate data recorded during the second time period, and the second trail map generated during the second time period. Further, in another instance, the computing device may generate a third sonar log that links the first trail map 310 to the second trail map 320 by coupling the first end point 314 of the first trail map 310 to the second start point 322 of the second trail map 320 to thereby generate a third trail map 330 beginning with the first start point 312 of the first trail map 310 and terminating with the second end point 324 of the second trail map 320. Still further, the computing device may be configured to upload one or more of the first sonar log (including data and information related thereto), the second sonar log (including data and information related thereto), and the third sonar log (including data and information related thereto) to at least one network database (e.g., a cloud) via a communication network.

Figure 4A:
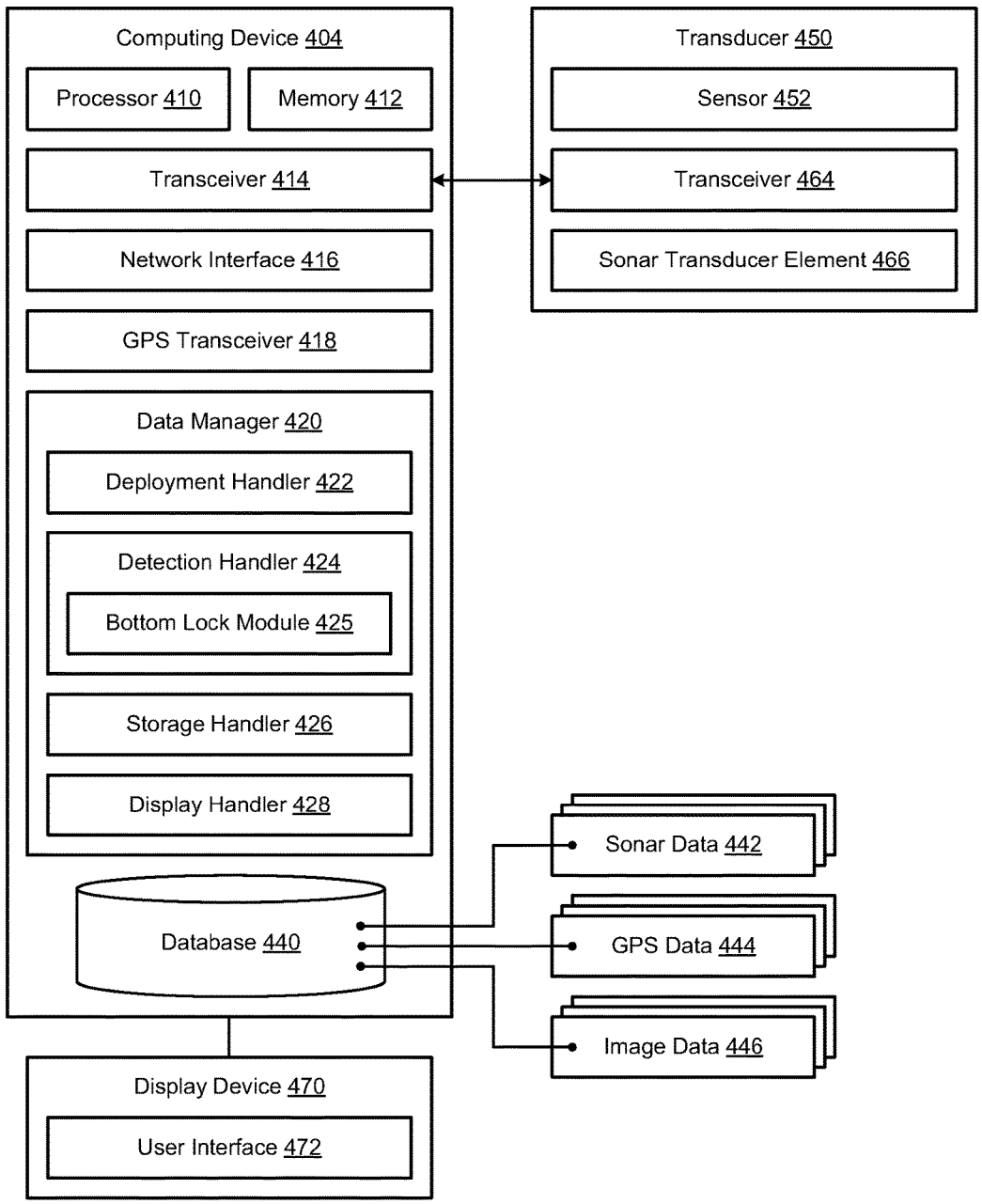
FIGS. 4A-4C illustrate systems for event triggering using sonar data in accordance with implementations of various techniques described herein.
Figure 4B:
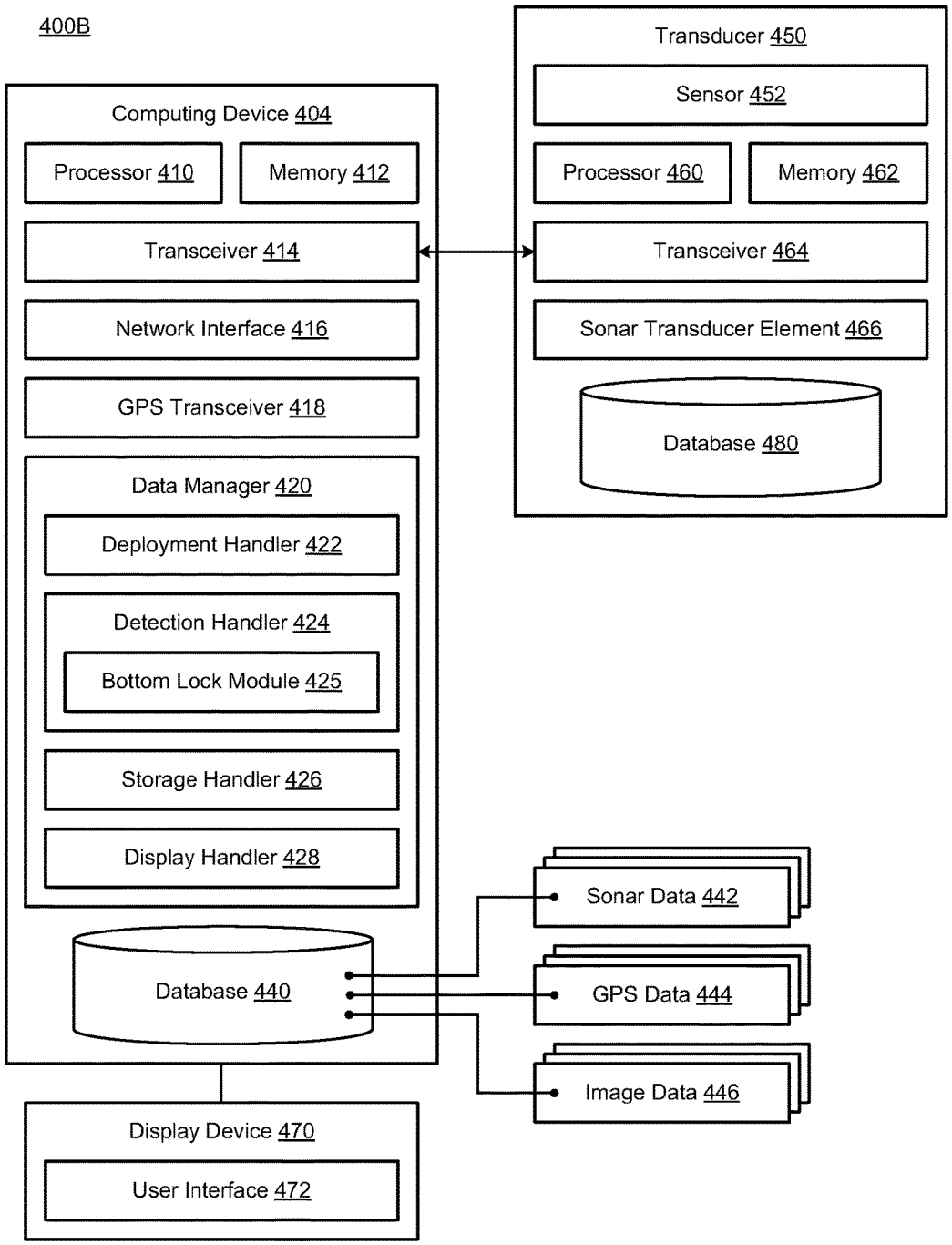
Figure 4C:
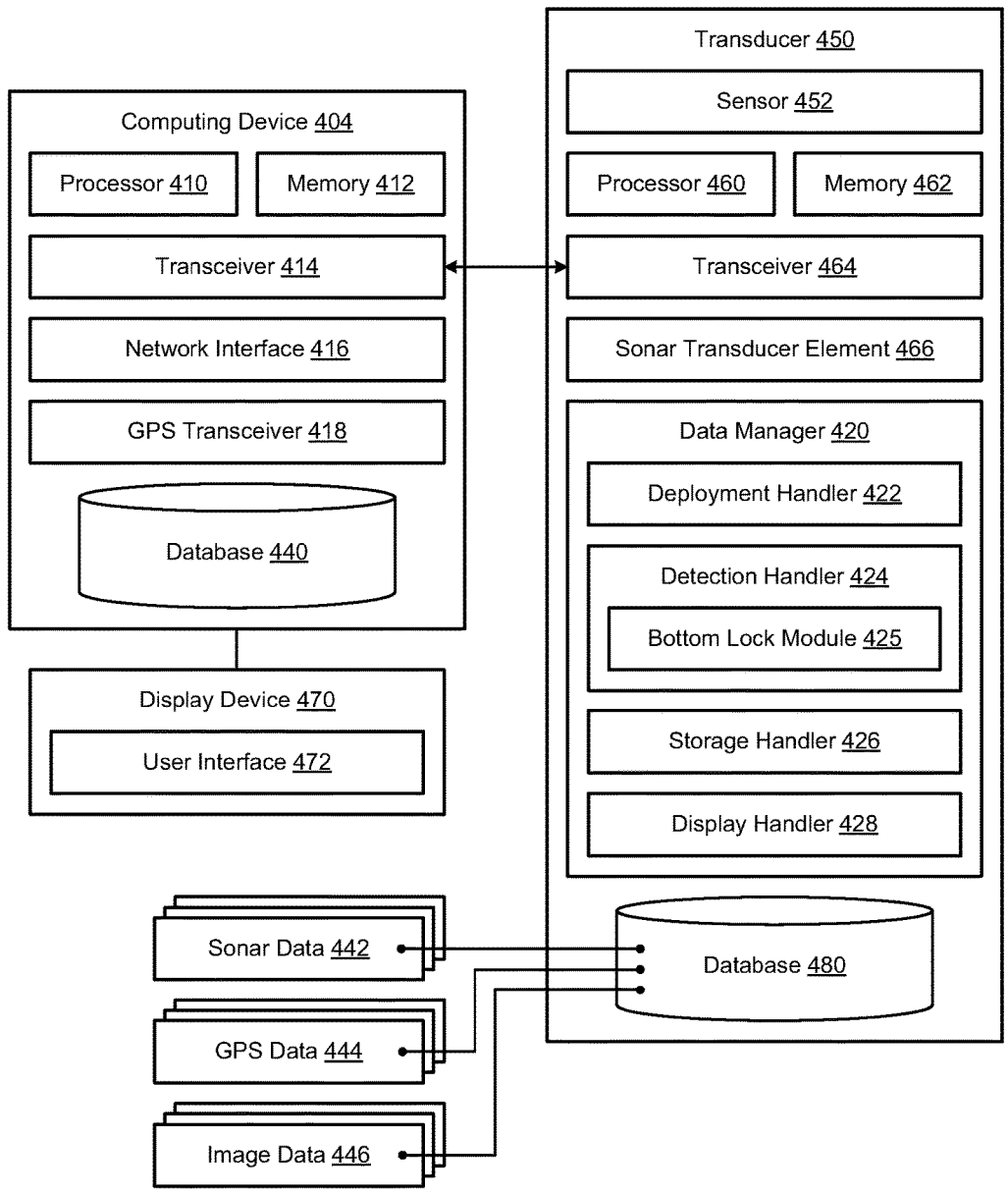

FIGS. 4A-4C illustrate various systems for event triggering using sonar data in accordance with implementations of various techniques described herein.

FIG. 4A illustrates a system 400A for event triggering using sonar data in accordance with implementations of various techniques described herein. In FIG. 4A, a computing device 404 may be used to collect various types of data and/or information related to imaging subsurface environmental features under/in a body of water, such as sonar data. Imaging subsurface environmental features in a body of water may include mapping an underwater environment below a surface of the body of water between the surface of the body of water and the bottom or floor of the body of water. In reference to FIG. 4A, the computing device 404 may refer to or embody a marine electronics device, such as a multi-function display (MFD), an example of which is described in FIG. 7, that may be used to record, store, display, receive, and transmit marine electronics data, including sonar data.

In FIG. 4A, the system 400A includes a computing device 404 configured as a special purpose machine for interfacing with a transducer 450, such as a sonar transducer. In this example, the computing device 404 may include standard elements and/or components, including at least one processor 410, memory 412 (e.g., non-transitory computer-readable storage medium), at least one database 440, power, peripherals, and various other computing elements and/or components that may not be specifically shown in FIG. 4A. Further, the system 400A may be associated with a display device 470 (e.g., a monitor or other display) that may be used to provide a user interface (UI) 472, including a graphical user interface (GUI). In FIG. 4A, the display 470 is shown as a separate component; however, the display 470 may be incorporated as part of the computing device 404. The UI 472 may be used to receive one or more preferences from a user of the display device 470 for managing or utilizing the system 400A, including interfacing with the transducer 450. Further, the user may setup desired behavior of the computing system 404 and/or transducer 450 via user-selected preferences using the UI 472 associated with the display device 470. Various elements and/or components of the system 400 that may be useful for the purpose of implementing the system 400A may be added, included, and/or interchanged, in manner as described herein.

In some implementations, the computing device 404 may be configured for other marine based applications. For instance, the computing device 404 may be configured for controlling operation of a vessel (e.g., a boat or other watercraft).

The computing device 404 may be configured to interface and communicate with the transducer 450 (e.g., vessel-mounted sonar transducer or castable sonar transducer). The computing device 404 may include a transceiver 414, such as a radio frequency (RF) transceiver, that may be configured to interface and communicate with a corresponding transceiver 464 of the transducer 450. Using the transceivers 414, 464, various types of data including sonar data 442 may be communicated, transmitted, and/or relayed between the computing device 404 and the transducer 450. In some examples, the computing device 404 may be configured to receive and recognize sonar data communicated, transmitted, and/or relayed from the transducer 450 and begin to scroll and/or display the sonar data received form the transducer 450 to a user via the display device 470. The computing device 404 may further begin to display the sonar data according to the behavior setup by the user via user-selected preferences input by the user via the UI 472. The database 440 may be configured to store/record the sonar data 442 associated with the transducer 450. The database 440 may be configured to store/record image data 446 associated with the sonar data 442. As described herein, the image data 446 may include images associated with one or more maps including, for example, the trail maps 310, 320, 330 of FIGS. 3A, 3B, 3C.

In one implementation, the computing device 404 may be configured to record and/or display sonar data to a user via the display device 470 when the transducer 450 is powered-up or powered-on and stop recording and/or displaying sonar data when the transducer 450 is powered-down or powered-off. For instance, when powered-up, the computing device 404 may start recording and/or start displaying the sonar data, e.g., according to the behavior setup by the user, and when powered-down, the computing device 404 may stop recording and/or stop displaying the sonar data e.g., according to the behavior setup by the user.

In one implementation, the computing device 404 may automatically upload the sonar data to a remote server and/or database via a wired or wireless network. For instance, the computing device 404 may be configured to interface and communicate with at least one network server (e.g., cloud server) via at least one network (e.g., cloud based network). The computing device 404 may include a network interface 416, such as a wired or wireless device configured to interface and communicate with various types of network communication protocols (e.g., Ethernet, Bluetooth, Wi-Fi, LAN, WLAN, cellular, etc.). Further, the computing device 404 may be configured to interface and communicate with one or more network servers over a network via one or more of the various types of network communication protocols. Using the network interface 416, various types of data including the sonar data 442 may be communicated, transmitted, and/or relayed between the computing device 404 and the network server(s). As such, the computing device 404 may be configured to automatically record the sonar data 442 in memory (e.g., database 440), display the sonar data 442 to a user via the display device 470, and upload the sonar data 442 to a database(s) server via a network, such as a wired or wireless network. The database server may be configured to store/record the sonar data 442 associated with the transducer 450 and/or store/record the image data 446 associated with the sonar data 442.

The computing device 404 may include a global positioning system (GPS) transceiver 418, such as a radio frequency (RF) transceiver configured to receive GPS related data and/or information 444 from a global positioning satellite system, relay antenna, or the like. The GPS data 444 may include geo-coordinate, geo-spatial, and/or geographical positioning related data generated and/or received by the GPS transceiver 418. The GPS data 444 may be associated with mapping or tracking geospatial coordinates of the computing device 404 and/or the transducer 450. In some implementations, the GPS data 444 may be communicated, transmitted, and/or relayed between the computing device 404 and a network database server (e.g., a cloud based server). The database 440 may be configured to store/record the GPS data 444 in association with the sonar data 442, which may be associated with the transducer 450. The database 440 may be further configured to store/record image data 446 associated with the GPS data 444 and the sonar data 442.

In some implementations, as described herein, one or more of the sonar data 442, the GPS data 444, and the image data 446 may be uploaded to a remote server over a network via the network interface 416. In reference to displaying sonar images, some computing devices, other than the computing device 404, may not be able to recognize or display the sonar data 442. In this instance, the computing device 404 may be configured to translate the sonar data 442 into a more globally recognizable image format as the image data 446 for display by various other computing devices. After translation, the computing device 404 may be configured to store/record the image data 446 in memory, such as the database 440.

In one implementation, the computing device 404 may include computer-executable instructions related to a data manager or software module 420 configured to cause the at least one processor 410 to manage the sonar data 442. The data manager 420 may be configured to manage geographical positioning related data (i.e., GPS data 444) generated by and/or received from the GPS transceiver 418. The geographical positioning data may be associated with mapping or tracking geospatial coordinates. The data manager 420 may be configured to manage the image data 446. As described herein, the computer-executable instructions may be stored/recorded in memory medium, such as a non-transitory computer-readable storage medium (e.g., memory 412).

The data manager 420 may include computer-executable instructions related to a deployment handler or software module 422 configured to sense deployment of the transducer 450 in water in a body of water based on receiving sonar data and/or a first signal from the transducer 450. In some implementations, the first signal may include a first command signal to start detecting a bottom of a body of water based on the sonar data 442 generated by and received from the transducer 450. In other implementations, the deployment handler 422 may be configured to sense deployment of the transducer 450 based on receiving the sonar data 442 from the transducer 450. In some examples, the deployment handler 422 may be configured to sense removal of the transducer 450 from the body of water based on no longer receiving sonar data from the transducer 450 or based on receiving a second signal from the transducer 450. The second signal may include a second command to stop recording the sonar data 442 generated by and received from the transducer 450.

The data manager 420 may include computer-executable instructions related to a detection handler or software module 424 having a bottom lock software module or component 425. The bottom lock module 425 of the detection handler 424 may be configured to detect a bottom or floor of the body of water based on the sonar data received form the transducer 450. For instance, the bottom lock module 425 may be configured to utilize one or more bottom detection algorithms to detect (locate and/or gain a lock on) a bottom of a body of water. In various instances, bottom lock and/or bottom detection algorithms may refer to various processing techniques where sonar is used to detect a seafloor (or seabed) below a water surface and calculate variations in water depth from the water surface to the seafloor. In various implementations, these bottom lock techniques may refer to bottom tracking processes.

The detection handler 424 may be further configured to automatically trigger (i.e., auto-trigger) at least one event based on receiving the sonar data 442 from the transducer 450 and after detecting a bottom of a body of water. The at least one event may include automatically recording (i.e., auto-recording) the sonar data 442 generated by and received from the transducer 450. In some examples, the detection handler 424 may be configured to automatically trigger at least one other event based on no longer receiving the sonar data from the transducer 450 and/or receiving the second signal from the transducer 450. In some instances, the at least one other event may include stopping (ceasing or terminating) recording of the sonar data 442 generated by and received from the transducer 450.

The data manager 420 may include computer-executable instructions related to a storage handler or software module 426 configured to automatically record the sonar data 442 in memory (e.g., memory 412 and/or database 440) upon receiving the sonar data 442 from the transducer 450. In some examples, recording the sonar data 442 generated by the transducer 450 may include logging the sonar data 442 generated by the transducer 450 and the geographical coordinate data (GPS data 444) generated by the GPS transceiver 418 associated with the transducer 450. In some examples, the database 440 may be configured to store/record image data 446 associated with the sonar data 442. In some examples, the storage handler 426 may be configured to automatically upload the sonar data 442 and/or the GPS data 444 to at least one database via a network, such as, e.g., a remote server database (e.g., cloud based server) via a communication network (e.g., cloud based network), including a wireless communication network.

The data manager 420 may include computer-executable instructions related to a display handler or software module 428 configured to display images associated with the sonar data 442, e.g., to a user via the display device 470. The display handler 428 may be configured to generate image data 446 associated with the sonar data 442 and further display images generated from the image data 446 and sonar data 442 to a user via a display, such as the display device 470. The display handler 428 may be configured to display images associated with a map to the user based on the sonar data 442 and the geographical coordinate data (i.e., GPS data 444).

As shown in FIG. 4A, the system 400A includes the transducer 450, such as a sonar transducer, related to the computing device 404. As described, the transducer 450 may include a vessel-mounted (or vessel-coupled) sonar transducer or a castable sonar transducer. Generally, the term sonar (i.e., SOund Navigation And Ranging) refers to various techniques for propagating sound underwater to detect objects on or under a surface of a body of water, such as fish, plants, rocks, sea floor, etc. One type of sonar technology refers to active sonar that is configured to emit pulses of sound waves while receiving echoes, which refers to pinging. Sonar may be used to determine acoustic locations and/or measurements of echo characteristics for targets and objects in a body of water. Further, acoustic frequencies used in sonar based devices may vary from low frequency (i.e., infrasonic) to high frequency (i.e., ultrasonic).

The transducer 450 may include a sensor 452, such as a dedicated sensor, configured to automatically sense deployment and removal of the transducer 450 in a body of water. In some examples, automatically sensing deployment of the transducer 450 in a body of water may occur after launching a vessel (e.g., a boat) in the body of water, where the transducer 450 may be coupled (e.g., mounted) to the vessel. In some examples, automatically sensing deployment of the transducer 450 in the body of water may occur after casting the transducer 450 in the body of water by a user. In some other examples, automatically sensing deployment of the transducer 450 in the body of water may trigger a control signal to power-up the transducer 450 to begin transmitting or relaying sonar data to the computing device 404 via the transceiver 464. Further, as described herein, the transducer 450 may be configured to automatically sense removal from the body of water, which may trigger another control signal to power-down the transducer 450 to thereby stop or terminate the transmitting or relaying of sonar data to the computing device 404 via the transceiver 464.

In one implementation, the sensor 452 may include an electrical/electronic circuit having an open circuit portion with at least two separate terminals with each terminal attached to exposed electrodes configured to conduct electricity therebetween when water in between the electrodes provides a closed circuit at the open circuit portion. Generally, water including electrolytes is conductive when an electrical current is applied. When the transducer 450 is placed in the body of water, the electrodes are configured to conduct electricity when water is present between the electrodes, to thereby complete a water sensing circuit of the sensor 452 and provide an indication signal that the transducer 450 is deployed in water and/or a body of water. In this manner, the sensor 452 may be configured to automatically sense deployment of the transducer 450 in the body of water and provide one or more signals indicative thereof, including a first signal and a second signal. For instance, the first signal may be indicative of a first command to start detecting a bottom of a body of water and auto-recording sonar data generated by and received from the transducer 450. The second signal may be indicative of a second command to stop recording sonar data generated by the transducer 450. In some instances, these sensing signals may be transmitted to the computing device 404 via the transceivers 414, 464 for processing by the at least one processor 410 and storage in the memory 412 and/or the database 440.

In one implementation, the transducer 450 may be mounted to a vessel (e.g., a boat or other watercraft) and be configured to at least partially submerge below a surface of the body of water when the vessel is launched in the body of water. For instance, the transducer 450 may be mounted on an underside of the vessel and be completely submerged in the body of water. In another instance, the transducer 450 may be mounted on a sidewall of the vessel and at least partially float in the body of water along with the vessel. In other instances, the transducer 450 may be coupled, tethered, or tied to the vessel via a tether, rope, or string and at least partially float alongside the vessel or be at least partially submerged alongside the vessel. Alternatively, the transducer 450 may be part of a castable device configured to at least partially float on a surface of the body of water. Further, the transducer 450 may be part of a device configured to at least partially submerge below a surface of the body of water. Since the device is castable by a user, this device may be referred to as a castable sonar transducer.

The transducer 450 may be configured to include the transceiver 464. The transducer 450 may be configured to interface and communicate with the computing device 404 via the transceiver 464, such as a RF transceiver, which may be configured to wirelessly communicate with the corresponding transceiver 414 of the computing device 404 via a wireless communication channel. Using the transceivers 414, 464, various types of data including sonar data 442 may be communicated, transmitted, and/or relayed between the transducer 450 and the computing device 404. Once the sonar data 442 is transferred, the database 440 of the computing device 404 may be configured to store/record the sonar data 442 generated by and received from the transducer 450. In other examples, the database 440 may be configured to store/record image data 446 associated with the sonar data 442.

The transducer 450 may be configured to include a sonar element, such as a sonar transducer element 466. The transducer 450 may be configured to use sonar technology to evaluate attributes of a target object by interpreting echoes from sound waves. In various examples, the transducer 450 may be configured to actively generate low and/or high frequency sound waves and evaluate echoes received back by the transducer 450 to thereby measure time intervals between sending signals and receiving corresponding echoes to determine distance to target objects. The transducer 450 may be configured to convert energy into sound waves via transducer elements, such as piezoelectric transducers or capacitive transducers that are configured to convert electrical energy into sound. The transducer 450 may be configured to use piezoelectric crystals that include a property of changing size when a voltage is applied, whereby applying an alternating current (AC) across the piezoelectric crystals causes oscillations at high frequencies, to thereby generate high frequency sound waves. In some instances, focusing the sound waves generated by the transducer 450 may be determined by an area and shape of the transducer 450, the sound wave frequency of the transducer 450, and the sound velocity of the propagation medium, such as a body of water. The sonar transducer element 466 may use piezoelectric crystals configured as transceivers to transmit and detect sound waves in one or more elements, including propagating sound waves and receiving echoing sound waves.

FIG. 4B illustrates another system 400B for event triggering in accordance with implementations of various techniques described herein. FIG. 4B includes similar elements as shown and described in reference to FIG. 4A.

For instance, the computing device 404 and components thereof may include similar scope and functionality of the computing device 404 and components shown in FIG. 4A. Likewise, the transducer 450 and components thereof may include similar scope and functionality of the transducer 450 and components shown in FIG. 4A.

In one implementation, the transducer 450 may include at least one processor 460, memory 462 (e.g., non-transitory computer-readable storage medium), at least one database 480, power, peripherals, and various other computing elements and/or components that may not be specifically shown. The transducer 450 may include instructions recorded on a non-transitory computer-readable medium, e.g., memory 462, and executable by the at least one processor 460.

The transducer 450 may be configured to interface and communicate with the computing device 404. The transducer 450 may include the transceiver 464 configured to communicate with corresponding transceiver 414 of the computing device 404. Using the transceivers 414, 464, various types of data including sonar data 442 generated by the sonar transducer element 466 of the transducer 450 may be communicated, transmitted, and/or relayed between the transducer 450 and the computing device 404. The database 480 may be configured to store/record the sonar data 442 generated by the sonar transducer element 466 of the transducer 450. The database 440 may be configured to store image data 446 associated with the sonar data 442.

FIG. 4C illustrates another system 400C for event triggering in accordance with implementations of various techniques described herein. FIG. 4C includes similar elements as shown and described in reference to FIGS. 4A and 4B.

For instance, the computing device 404 and components thereof may include similar scope and functionality of the computing device 404 and components shown in FIGS. 4A and 4B. Likewise, the transducer 450 and components thereof may include similar scope and functionality of the transducer 450 and components thereof shown in FIGS. 4A and 4B.

In FIG. 4C, the transducer 450 may include one or more elements and/or components of the computing device 404 that are configured in a manner as described in reference to FIG. 4A. For instance, the transducer 450 may include the data manager or software module 420 that is configured in a manner as described in reference to FIG. 4A. Further, the transducer 450 may include one or more software modules related to the deployment handler 422, detection handler 424, bottom lock module 425, storage handler 426, and display handler 428, each of which may be configured in a manner as described in reference to FIG. 4A. In some example, these software modules may be configured to process the sonar data 442 at the transducer 450 using the processor 460 and then provide the processed data and information to the computing device 404 via the transceivers 414, 464 for storing/recording thereof in the database 440 of the computing device 404.

In some implementations, the database 480 may be configured to store and record data related to one or more of the sonar data 442 and the image data 446 generated by the sonar transducer element 466 of the transducer 450. Further, the database 480 may be configured to store/record data related to GPS data 444 received from the computing device 404. The database 440 may be configured to store/record image data 446 associated with the sonar data 442 and the GPS data 444. As described herein, one or more of the sonar data 442, the GPS data 444, and the image data 446 may be uploaded to a remote server over the network via the network interface 416. In reference to displaying sonar images, some computing devices, other than the computing device 404, may not be able to recognize or display the sonar data 442. In this instance, the computing device 404 may be configured to translate the sonar data 442 into a more globally recognizable image format as the image data 446 for display by various other computing devices. After translation, the computing device 404 may be configured to store/record the image data 446 in memory, such as the database 440.

Figure 5:
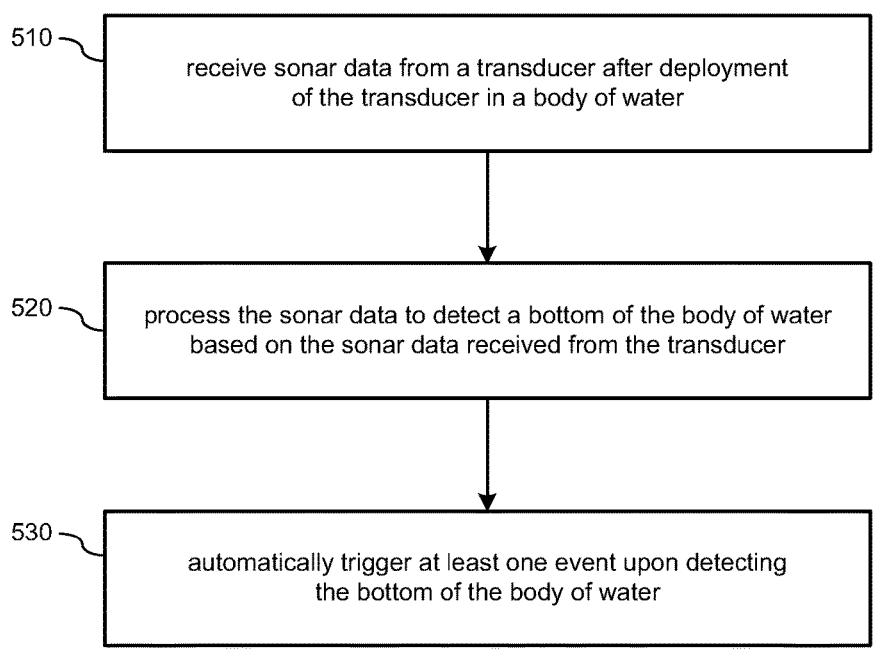
FIGS. 5-6 illustrate flow diagrams for various methods of event triggering in accordance with implementations of various techniques described herein.

FIG. 5 illustrates a flow diagram for a method 500 of event triggering using sonar data in accordance with implementations of various techniques described herein. In one implementation, method 500 may include managing sonar data generated by a transducer, including a sonar transducer. It should be understood that while method 500 indicates a particular order of execution of operations, in some examples, certain portions of the operations might be executed in a different order, and on different systems. Further, in other examples, additional operations or steps may be added to method 500. Similarly, some operations or steps may be omitted.

In various implementations, method 500 may be performed by a computing device, such as at least one of the computing devices described in reference to FIGS. 4A-4B. Further, method 500 may be implemented as an application on a tablet and/or a smart phone. In some other implementations, method 500 may be performed by any computer system, including a portable computer system, a personal computer, a remote server, a marine electronics device (e.g., device 700 of FIG. 7), a multi-function display (MFD), a network server, a cloud server, and the like.

At block 510, method 500 may receive sonar data from a transducer after deployment of the transducer in a body of water. For instance, the transducer may include a vessel-mounted sonar transducer configured to activate (e.g., power-up) and transmit sonar data when the vessel is deployed in water, such as the body of water. In another instance, the transducer may include a castable sonar transducer configured to activate and transmit when deployed in water.

At block 520, method 500 may process the sonar data to detect a bottom of the body of water based on the sonar data received from the transducer. For instance, after receiving sonar data from the transducer, the computing device may process the sonar data by performing one or more bottom detection algorithms (e.g., bottom lock) to detect (and/or gain a lock on) a bottom of a body of water. In some instances, bottom lock refers to processing techniques that utilize sonar data to detect a seafloor (or seabed) below a surface of a body of water and calculate variations in water depth from the water surface to the seafloor.

At block 530, method 500 may automatically trigger at least one event upon detecting the bottom of the body of water. In some implementations, the at least one event may include auto-recording the sonar data received from the transducer. In some other implementations, the at least one event may include auto-recording geographical positions related to geographical coordinate data received from a GPS transceiver. The at least one event may include auto-recording the sonar data and the GPS data.

In some implementations, method 500 may generate a trail map based on the geographical coordinate data received from a GPS transceiver and display images associated with the trail map. Method 500 may generate the trail map based on a plot of previously and/or currently recorded geographical positions related to the GPS data and display images associated with the trail map. Method 500 may generate a trail map based on the sonar data and the GPS data and display images associated with the trail map. Method 500 may map or track multiple navigated courses on a body of water based on the GPS data, generate at least one trail map for each navigated course with each trail map having at least one start point and at least one end point for each navigated course, and upload one or more of the sonar data, the GPS data, and each trail map to at least one database via a network.

In some implementations, method 500 may sense removal of the transducer from the body of water based on failing to detect the bottom of the body of water and trigger at least one other event upon sensing removal. The at least one other event may include stop recording of the sonar data generated by the transducer. Method 500 may upload the recorded sonar data to at least one database via a network after stopping recording of the sonar data.

In various implementations, method 500 may be activated continuously throughout a recreational trip, such as a fishing trip. For example, at the beginning of a fishing trip, the transducer may be activated and sonar data generated by the transducer may be recorded, displayed, and uploaded. In another example, at the end of the recreational trip, the transducer may be deactivated and recording terminated.

Figure 6:
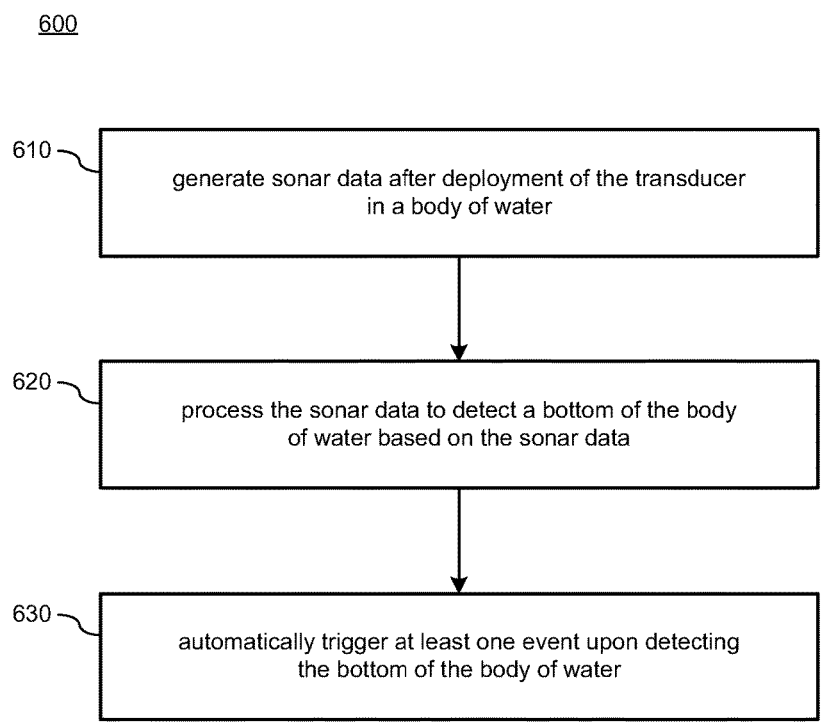

FIG. 6 illustrates a flow diagram for a method 600 of event triggering using sonar data in accordance with implementations of various techniques described herein. In one implementation, method 600 may include managing sonar data generated by a transducer, including a sonar transducer. It should be understood that while method 600 indicates a particular order of execution of operations, in some examples, certain portions of the operations might be executed in a different order, and on different systems. Further, in other examples, additional operations or steps may be added to method 600. Similarly, some operations or steps may be omitted.

In various implementations, method 600 may be performed by a transducer, such as at least one of the transducers of FIGS. 4B-4C. Further, method 600 may be implemented by various types of transducers, including, for instance, a vessel-mounted sonar transducer and/or a castable sonar transducer configured for interfacing with any computer system, including a portable computer system, a personal computer, a remote server, a marine electronics device (e.g., device 700 of FIG. 7), a MFD, a network server, a cloud server, and the like.

At block 610, method 600 may generate sonar data after deployment of the transducer in a body of water. For instance, the transducer may include a vessel-mounted sonar transducer configured to activate (e.g., power-up) and transmit sonar data to a computing device when the vessel is deployed in water, such as the body of water. In another instance, the transducer may include a castable sonar transducer configured to activate and transmit when deployed in water. The computing device may be configured to receive the sonar data transmitted by the transducer.

At block 620, method 600 may process the sonar data to detect a bottom of the body of water based on the generated sonar data. For instance, after deployment and activation, the transducer may be configured to process the sonar data to thereby detect a bottom or floor of a body of water. The transducer may process the sonar data by performing one or more bottom detection algorithms (e.g., bottom lock) to detect (and/or gain a lock on) a bottom of a body of water. In some instances, bottom lock refers to processing techniques that utilize sonar data to detect a seafloor (or seabed) below a surface of a body of water and calculate variations in water depth from the water surface to the seafloor.

At block 630, method 600 may automatically trigger at least one event upon detecting the bottom of the body of water. In some implementations, the at least one event including automatically transmitting the sonar data to the computing device for recording by the computing device. In some other implementations, the at least one event may include auto-recording geographical positions related to geographical coordinate data received from the computing device.

In some implementations, method 600 may sense removal of the transducer from the body of water based on failing to detect the bottom of the body of water and trigger at least one other event upon sensing removal. The at least one other event may include stop transmitting the sonar data generated by the transducer.

In some implementations, the sonar transducer may be coupled or mounted to a vessel that is configured to at least partially float on a surface of a body of water, and auto-transmitting the sonar data to a computing device occurs after launching the vessel in the body of water by a user. In some other implementations, the transducer is part of a user castable device that is configured to at least partially float on a surface of the body of water, and auto-transmitting the sonar data to a computing device occurs after casting the user castable device in the body of water by a user.

In various implementations, method 600 may be activated continuously throughout a recreational trip, such as a fishing trip. For example, at the beginning of a fishing trip, the transducer may be activated and sonar data generated by the transducer may be recorded, displayed, and uploaded. In another example, at the end of the recreational trip, the transducer may be deactivated and recording terminated.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Marine Computing System

Figure 7:
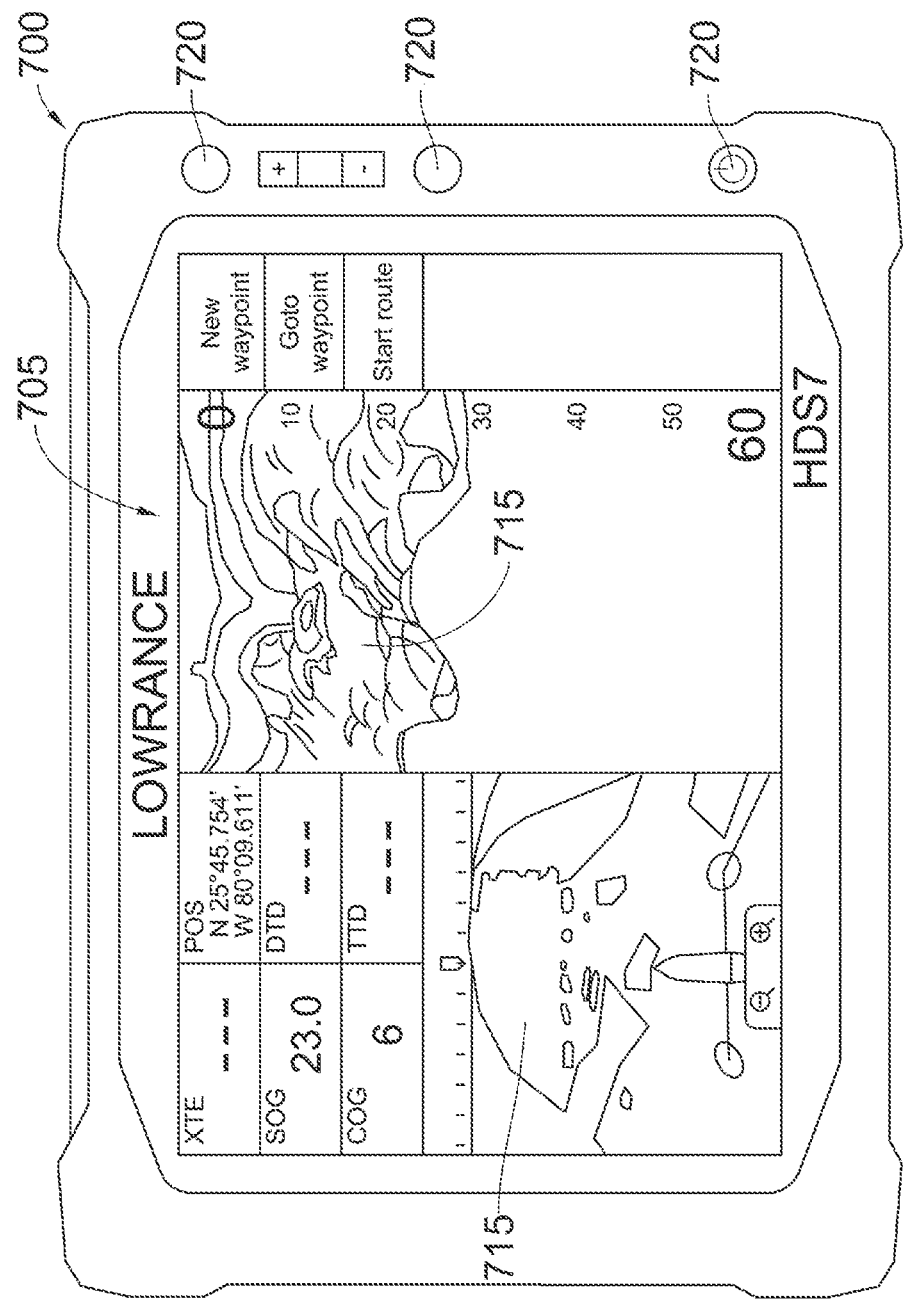
FIG. 7 illustrates a schematic of a marine electronics device in accordance with implementations of various techniques described herein.

FIG. 7 illustrates an example schematic of a marine electronics device 700 in accordance with implementations of various techniques described herein. The marine electronics device 700 includes a screen 705. In certain implementations, the screen 705 may be sensitive to touching by a finger. In other implementations, the screen 705 may be sensitive to the body heat from the finger, a stylus, or responsive to a mouse. The marine electronics device 700 may be attached to a National Marine Electronics Association (NMEA) bus or network. The marine electronics device 700 may send or receive data to or from another device attached to the NMEA 2000 bus. For example, the marine electronics device 700 may transmits commands and receive data from a motor or a sensor using an NMEA 2000 bus. In one implementation, the marine electronics device 700 may be capable of steering a vessel and controlling the speed of the vessel, i.e., autopilot. For example, one or more waypoints may be input to the marine electronics device 700, and the marine electronics device 700 may steer a vessel to the one or more waypoints. The marine electronics device 700 may transmit or receive NMEA 2000 compliant messages, messages in a proprietary format that do not interfere with NMEA 2000 compliant messages or devices, or messages in any other format. The device 700 may display marine electronic data 715. The marine electronic data types 715 may include chart data, radar data, sonar data, steering data, dashboard data, navigation data, fishing data, engine data, and the like. The marine electronics device 700 may also include a plurality of buttons 720, which may be either physical buttons or virtual buttons, or a combination thereof. The marine electronics device 700 may receive input through a screen 705 sensitive to touch or buttons 720.

As mentioned above, a marine computing system may be used to record and process sonar data. In one implementation, the marine computing system may take the form of a marine electronics device 700. The marine electronics device 700 may be operational with numerous general purpose or special purpose computing system environments or configurations.

The marine electronics device 700 may include any type of electrical and/or electronics device capable of processing data and information via a computing system. In one implementation, the marine electronics device 700 may be a marine instrument, such that the marine electronics device 700 may use the computing system to display and/or process the one or more types of marine electronics data.

The computing system may include a central processing unit (CPU), a system memory, a graphics processing unit (GPU), and a system bus that couples various system components including the system memory to the CPU. In various examples, the computing system may include one or more CPUs.

The CPU may include a microprocessor, a microcontroller, a processor, a programmable integrated circuit, or a combination thereof. The CPU can comprise an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 700). The monitor (MFD 700) includes a screen 705. In certain implementations, the screen 705 may be sensitive to touching by a finger. In other implementations, the screen 705 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs.

In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for example, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 700 is disposed. The GPS receiver system may then transmit the position data to the marine electronics device 700. In other examples, any positioning system known to those skilled in the art may be used to determine and/or provide the position data for the marine electronics device 700.

The marine electronics system may include one or more components disposed at various locations on the vessel. Such components may include one or more data modules, sensors, instrumentation, and/or any other devices known to those skilled in the art that may transmit various types of data to the marine electronics device 700 for processing and/or display. The various types of data transmitted to the marine electronics device 700 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar data, an AIS transponder for recording the AIS data, a paddlewheel sensor for recording the speed data, and/or the like.

The marine electronics device 700 may receive external data via the LAN or the WAN. In one implementation, the external data may relate to information not available from the marine electronics system. The external data may be retrieved from the Internet or any other source. The external data may include atmospheric temperature, tidal data, weather, moon phase, sunrise, sunset, water levels, historic fishing data, and other fishing data.

In one implementation, the marine electronics device 700 may be a multi-function display (MFD) unit, such that the marine electronics device 700 may be capable of displaying and/or processing multiple types of marine electronics data. FIG. 7 illustrates a schematic diagram of an MFD unit in accordance with implementations of various techniques described herein. In particular, the MFD unit may include the computing system, the monitor (MFD 700), the screen 705, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:
   receive sonar data from at least one transducer associated with a vessel after deployment of the transducer in a body of water;
   process the sonar data to detect a bottom of the body of water based on the sonar data received from the transducer; and
   in response to detecting the bottom of the body of water, automatically cause recording, in memory, geographical positions of the vessel as the vessel travels along the body of water and generating a trail map of the recorded geographical positions of the vessel.

2. The non-transitory computer-readable medium of claim 1, wherein the computer-executable instructions further cause the computer to:
   record the geographical positions based on geographical coordinate data received from global positioning system (GPS) transceiver.

3. The non-transitory computer-readable medium of claim 2, wherein the computer-executable instructions further cause the computer to:
   generate the trail map based on a plot of previously recorded geographical positions related to the geographical coordinate data received from the GPS transceiver, and
   display, on a screen, one or more images associated with the trail map.

4. The non-transitory computer-readable medium of claim 1, wherein, in response to detecting the bottom of the body of water, the computer-executable instructions automatically cause recording geographical positions of the vessel as the vessel travels along the body of water and generating the trail map of the recorded geographical positions of the vessel, wherein the computer-executable instructions further cause the computer to:
   generate the trail map based on the sonar data and geographical coordinate data received from a global positioning system (GPS) transceiver; and
   display, on a screen, one or more images associated with the trail map.

5. The non-transitory computer-readable medium of claim 1, wherein the computer-executable instructions further cause the computer to:
track multiple navigated courses on the body of water based on geographical coordinate data received from a global positioning system (GPS) transceiver;
generate a trail map for each navigated course, each trail map having a start point and an end point for each navigated course; and
upload one or more of the sonar data, the geographical coordinate data, and each trail map to at least one database via a network.

6. The non-transitory computer-readable medium of claim 1, wherein the computer-executable instructions further cause the computer to:
sense removal of the transducer from the body of water based on failing to detect the bottom of the body of water;
trigger, in response to failing to detect the bottom of the body of water, at least one of:
stopping recording of the sonar data generated by the transducer; or
uploading the recorded sonar data to at least one database via a network.

7. The non-transitory computer-readable medium of claim 1, wherein the computer-executable instructions further cause the computer to:
start generating a first trail map beginning at a first start point based on detecting the bottom of the body of water for a first time, wherein the first trail map is associated with tracking a first navigated course on the body of water based on the sonar data and geographical coordinate data received from a global positioning system (GPS) transceiver during the first time;
stop generating the first trail map terminating at a first end point based on failing to detect the bottom of the body of water; and
upload one or more of the sonar data recorded during the first time, the geographical coordinate data recorded during the first time, and the first trail map recorded during the first time to at least one database via a network.

8. The non-transitory computer-readable medium of claim 7, wherein the computer-executable instructions further cause the computer to:
start generating a second trail map different than the first trail map, the second trail map beginning at a second start point based on detecting the bottom of the body of water for a second time, wherein the second trail map is associated with tracking a second navigated course on the body of water based on the sonar data and geographical coordinate data received from a global positioning system (GPS) transceiver during the second time;
stop generating the second trail map terminating at a second end point based on failing to detect the bottom of the body of water; and
upload one or more of the sonar data recorded during the second time, the geographical coordinate data recorded during the second time, and the second trail map recorded during the second time to at least one database via a network.

9. The non-transitory computer-readable medium of claim 8, wherein the computer-executable instructions further cause the computer to:
generate a first sonar log that includes one or more of the sonar data recorded during the first time, the geographical coordinate data recorded during the first time, and the first trail map generated during the first time;
generate a second sonar log that includes one or more of the sonar data recorded during the second time, the geographical coordinate data recorded during the second time, and the second trail map generated during the second time; and
generate a third sonar log that links the first trail map to the second trail map by coupling the first end point of the first trail map to the second start point of the second trail map to thereby generate a third trail map beginning with the first start point of the first trail map and terminating with the second end point of the second trail map; and
upload one or more of the first sonar log, the second sonar log, and the third sonar log to at least one database via a network.

10. The non-transitory computer-readable medium of claim 1, wherein:
the transducer is coupled or mounted to the vessel, wherein the vessel is configured to at least partially float on a surface of the body of water, and
processing the sonar data received from the transducer occurs after launching the vessel in the body of water by a user.

11. The non-transitory computer-readable medium of claim 1, wherein:
the transducer is part of a user castable device that is configured to at least partially float on a surface of the body of water, and
processing the sonar data received from the transducer occurs after casting the transducer in the body of water by a user.

12. The non-transitory computer-readable medium of claim 1, wherein the computer-executable instructions further cause the computer to, in response to detecting the bottom of the body of water, automatically cause recording, in memory, the sonar data received from the at least one transducer.

13. The non-transitory computer-readable medium of claim 12, wherein the computer-executable instructions further cause the computer to:
display, on a screen, one or more images associated with at least one of the recorded sonar data or the generated trail map.

14. A transducer assembly, the transducer assembly comprising:
a processor; and
memory including instructions that cause the processor to:
generate sonar data after deployment of the transducer in a body of water;
process the sonar data to detect a bottom of the body of water based on the sonar data; and
in response to detecting the bottom of the body of water, automatically cause transmission of the sonar data to a computing device along with instruction for the computing device to record the sonar data in a memory of the computing device.

15. The transducer assembly of claim 14, wherein:
the sonar transducer is coupled or mounted to a vessel that is configured to at least partially float on a surface of the body of water, and
automatically transmitting the sonar data to the computing device occurs after launching the vessel in the body of water.

16. The transducer assembly of claim 14, wherein:
the transducer is part of a user castable device that is configured to at least partially float on a surface of the body of water, and
automatically transmitting the sonar data to the computing device occurs after casting the user castable device in the body of water.

17. The transducer assembly of claim 14, wherein the memory further comprises instructions that cause the computer to:
sense removal of the transducer from the body of water based on failing to detect the bottom of the body of water; and
in response to failing to detect the bottom of the body of water, automatically causing transmission of the sonar data to the computing device to cease.

18. A castable device, the castable device comprising:
at least one sonar transducer element;
a processor; and
memory including instructions that cause the processor to:
receive sonar data from the at least one sonar transducer element after deployment of the castable device in a body of water;
process the sonar data to detect a bottom of the body of water based on the sonar data received from the at least one sonar transducer element; and
in response to detecting the bottom of the body of water, automatically cause transmission of the sonar data to a computing device along with instruction for the computing device to record the sonar data in a memory of the computing device.

19. The castable device of claim 18, wherein:
the castable device is configured to at least partially float on a surface of the body of water; and
automatically transmitting the sonar data to the computing device occurs after casting the user castable device in the body of water.

20. The castable device of claim 18, wherein the memory further comprise instructions that cause the computer to:
sense removal of the castable device from the body of water based on failing to detect the bottom of the body of water; and
in response to failing to detect the bottom of the body of water, automatically causing transmission of the sonar data to the computing device to cease.

* * * * *